US012470947B2

(12) United States Patent
Shim

(10) Patent No.: US 12,470,947 B2
(45) Date of Patent: Nov. 11, 2025

(54) COMMUNICATION SYSTEM AND METHOD USING LARGE INTELLIGENT SURFACE

(71) Applicant: Samsung Electronics Co., Ltd., Suwon-si (KR)

(72) Inventor: Seijoon Shim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 473 days.

(21) Appl. No.: 17/969,153

(22) Filed: Oct. 19, 2022

(65) Prior Publication Data

US 2023/0139611 A1     May 4, 2023

Related U.S. Application Data

(63) Continuation of application No. PCT/KR2022/013323, filed on Sep. 6, 2022.

(30) Foreign Application Priority Data

Nov. 2, 2021    (KR) ........................ 10-2021-0148735

(51) Int. Cl.
*H04W 16/28*      (2009.01)
*H04B 7/06*       (2006.01)
(Continued)

(52) U.S. Cl.
CPC ............. *H04W 16/28* (2013.01); *H04B 7/06* (2013.01); *H04W 48/10* (2013.01); *H04W 72/542* (2023.01)

(58) Field of Classification Search
CPC ...... H04B 7/024; H04B 7/04013; H04B 7/06; H04B 7/08; H04L 7/04; H04W 16/28; H04W 48/10; H04W 72/542
(Continued)

(56) References Cited

U.S. PATENT DOCUMENTS 7,307,589 B1    12/2007    Gregoire et al.
9,859,756 B2     1/2018    Leabman et al.
(Continued)

FOREIGN PATENT DOCUMENTS

KR    10-2019-0004161 A    1/2019
KR    10-2019-0074144 A    6/2019
(Continued)

OTHER PUBLICATIONS

Smart Radio Environments Empowered by Reconfigurable Intelligent Surfaces: How it Works, State of Research, and Road Ahead (Year: 2020)Marco Di Renzo, Alessio Zappone, Merouane Debbah, Mohamed-Slim Alouini, Chau Yuen, Julien de Rosny, Sergei Tretyakov.*
(Continued)

*Primary Examiner* — Ayman A Abaza
*Assistant Examiner* — Abdul Aziz Santarisi
(74) *Attorney, Agent, or Firm* — Jefferson IP Law, LLP

(57) ABSTRACT

A wireless communication method using a large intelligent surface (LIS) is provided. The method includes transmitting preamble signals each with a different transmission time and transmission direction, receiving preamble signals through an LIS through which an incident radio wave is received and reflected and determining a reference angle of incidence for the preamble signals, receiving the preamble signals that are delivered through a multipath from the terminal, transmitting identification information of a preamble signal having the largest reception power among the received preamble signals to the LIS server, and when the preamble signals includes a preamble signal corresponding to the identification information received from the base station, controlling the LIS such that an angle of reflection at which a data service signal transmitted from the base station is reflected by the LIS corresponds to the reference angle of incidence
(Continued)

determined for the preamble signal of the identification information.

20 Claims, 11 Drawing Sheets

(51) Int. Cl.
 *H04W 48/10* (2009.01)
 *H04W 72/542* (2023.01)
(58) Field of Classification Search
 USPC .......................................................... 370/338
 See application file for complete search history.

(56) References Cited

U.S. PATENT DOCUMENTS

| | | | |
|---|---|---|---|
| 10,627,695 | B2 | 4/2020 | Park |
| 10,862,217 | B2 | 12/2020 | Kasahara |
| 10,866,360 | B2 | 12/2020 | Khorasaninejad et al. |
| 10,871,352 | B2 | 12/2020 | Kante et al. |
| 10,901,149 | B2 | 1/2021 | Kim et al. |
| 10,996,451 | B2 | 5/2021 | Tamma |
| 2019/0086579 | A1 | 3/2019 | Kim et al. |
| 2020/0144717 | A1 | 5/2020 | Polehn et al. |
| 2021/0013619 | A1* | 1/2021 | Alkhateeb .......... H04B 7/04013 |
| 2021/0119327 | A1 | 4/2021 | Fang et al. |
| 2021/0337617 | A1* | 10/2021 | Bao ..................... H04W 74/04 |
| 2022/0052764 | A1* | 2/2022 | Medra .................. H04B 10/614 |

FOREIGN PATENT DOCUMENTS

| | | |
|---|---|---|
| KR | 10-2020-0020630 A | 2/2020 |
| WO | 2021/109345 A1 | 6/2021 |

OTHER PUBLICATIONS

Hu et al., Beyond Massive-Mimo: The Potential of Positioning with Large Intelligent Surfaces, IEEE Transactions on Signal Processing, May 19, 2017.
Renzo et al., Smart radio environments empowered by reconfigurable AI meta-surfaces: an idea whose time has come, EURASIP Journal on Wireless Communications and Networking, 2019.
Jung et al., Performance Analysis of Large Intelligent Surfaces (LISs): Asymptotic Data Rate and Channel Hardening Effects, IEEE Transactions on Wireless Communications, 2019.
Ferreira et. al., Large Intelligent Surfaces Communicating Through Massive MIMO Rayleigh Fading Channels, sensors, Oct. 14, 2020.
Samsung research paper, 6G The Next Hyper-Connected Experience for All, Samsung Research, 2020.
Shalaev, From Metamaterials To Metasurfaces, Purdue University 2013.
Chandradeep Singh et al., 'Fast Beam Training for RIS-Assisted Uplink communication', arXiv:2107.14138v1 [eess.SP], Jul. 23, 2021.
Qasim Sultan et al., 'Fast Beam Training Technique for Millimeter-Wave Cellular Systems with an Intelligent Reflective Surface', Sensors 2021, 21(14), 4936, Jul. 20, 2021.
Changsheng You et al., 'Fast Beam Training for IRS-Assisted Multiuser Communications', arXiv:2005.11652v2 [cs.IT], Jun. 27, 2020.
International Search Report dated Dec. 13, 2022, issued in International Patent Application No. PCT/KR2022/013323.
Extended European Search Report dated Feb. 11, 2025; European Appln. No. 22890154.2-1206 / 4404476 PCT/KR2022013323.

\* cited by examiner

COMMUNICATION SYSTEM AND METHOD USING LARGE INTELLIGENT SURFACE

CROSS-REFERENCE TO RELATED APPLICATION(S)

This application is a continuation application, claiming priority under § 365(c), of an International application No. PCT/KR2022/013323, filed on Sep. 6, 2022, which is based on and claims the benefit of a Korean patent application number 10-2021-0148735, filed on Nov. 2, 2021, in the Korean Intellectual Property Office, the disclosure of which is incorporated by reference herein in its entirety.

BACKGROUND

1. Field

The disclosure relates to communication technology using a large intelligent surface (LIS).

2. Description of Related Art

Currently, as a new radio (NR) standard that is a 5th generation (5G) data transmission method is completed by $3^{rd}$ Generation Partnership Project (3GPP) Release 16 and standardization of 3GPP Release 17 is in progress, many studies are being conducted on beyond-5G data transmission technique. One of core beyond-5G techniques is a communication system using a meta-surface. The meta-surface includes a meta material. The largest difference between the meta-surface and a normal surface lies in that it is possible to adjust a reflection and a refraction by adjusting a density of a medium by applying a stimulus to the meta material and by transforming a wavelength form of a signal according to a generalized Snell's law.

A large intelligent surface (LIS) system that is one of systems using the meta-surface allows a data transmission beyond an existing large-capacity antenna system.

The above information is presented as background information only to assist with an understanding of the disclosure. No determination has been made, and no assertion is made, as to whether any of the above might be applicable as prior art with regard to the disclosure.

SUMMARY

To secure a larger frequency bandwidth in 5G communication and 6th generation (6G) communication, communication using a millimeter wave (mmWave) (e.g., 10 to 100 gigahertz (GHz)) frequency or a terahertz (e.g., 0.1 to 10 terahertz (THz)) frequency is being discussed. In this frequency bandwidth, a free space loss (FSL) is very large and thus, it is important to minimize a pathloss by securing a line-of-sight (LOS).

Aspects of the disclosure are to address at least the above-mentioned problems and/or disadvantages and to provide at least the advantages described below. Accordingly, an aspect of the disclosure is to provide a communication system for minimizing a pathloss using a large intelligent surface (LIS).

Additional aspects will be set forth in part in the description which follows and, in part, will be apparent from the description, or may be learned by practice of the presented embodiments.

In accordance with an aspect of the disclosure, a communication method using an LIS is provided. The communication method includes transmitting, by a terminal, preamble signals each with a different transmission time and transmission direction, receiving, by an LIS server, at least one preamble signal among the preamble signals through an LIS through which an incident radio wave is received and reflected and determining a reference angle of incidence for the at least one preamble signal, receiving, by a base station, the preamble signals that are delivered through a multipath from the terminal, transmitting, by the base station, identification information of a preamble signal having the largest reception power among the received preamble signals to the LIS server, and when the at least one preamble signal includes a preamble signal corresponding to the identification information received from the base station, controlling, by the LIS server, the LIS such that an angle of reflection at which a data service signal transmitted from the base station is reflected by the LIS corresponds to the reference angle of incidence determined for the preamble signal of the identification information.

In accordance with another aspect of the disclosure, a communication system using an LIS is provided. The communication system includes a terminal, a base station, an LIS including a meta-surface and in which an angle of reflection of an incident radio wave is adjusted according to an electrical stimulation, and an LIS server configured to control the LIS. The terminal may be configured to transmit preamble signals each with a different transmission time and transmission direction, the LIS server may be configured to receive at least one preamble signal among the preamble signals through the LIS and determine a reference angle of incidence for the at least one preamble signal, the base station may be configured to receive the preamble signals that are delivered through a multipath from the terminal, and transmit identification information of a preamble signal having the largest reception power among the received preamble signals to the LIS server, and the LIS server may be configured to, when the at least one preamble signal includes a preamble signal corresponding to the identification information received from the base station, control the LIS such that an angle of reflection at which a data service signal transmitted from the base station is reflected by the LIS corresponds to the reference angle of incidence determined for the preamble signal of the identification information.

A communication system using an LIS according to an example embodiment may determine a terminal that requests a data service and a location of the corresponding terminal, and may control the LIS such that a signal transmitted from a base station may be reflected by the LIS and delivered to the terminal, thereby minimizing a pathloss of the signal transmitted from the base station.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
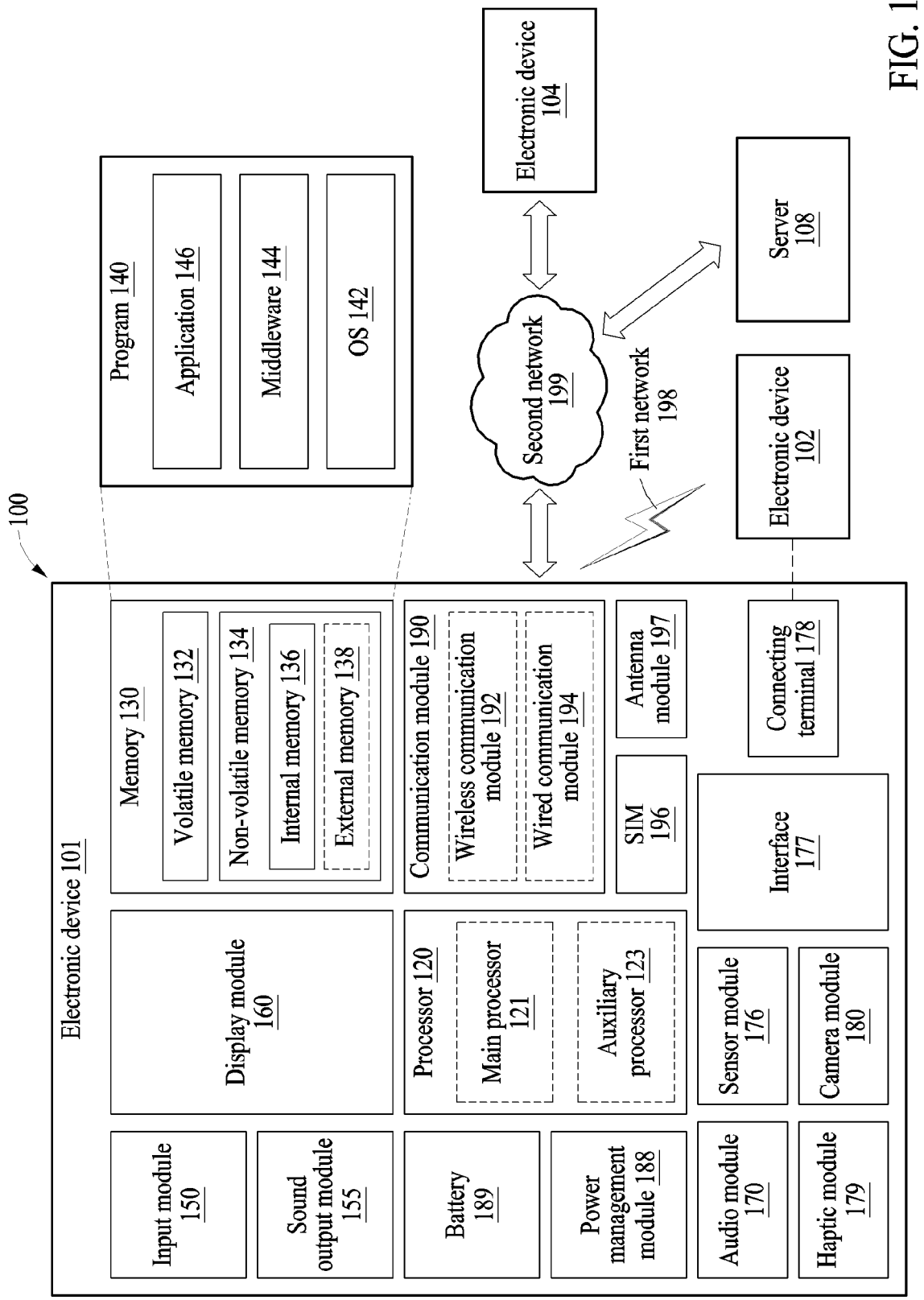
FIG. 1 is a block diagram illustrating an example terminal in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or communicate with at least one of an external electronic device 104 or a server 108 via a second network 199 (e.g., a long-range wireless communication network). According to an example embodiment, the electronic device 101 may communicate with the external electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the external electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the external electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., an LAN or a wide area network (WAN))). These various types of communication modules may be implemented as a single component (e.g., a single chip), or may be implemented as multi components (e.g., multi chips)

separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a $4^{th}$ generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the external electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form an mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102 and 104 and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
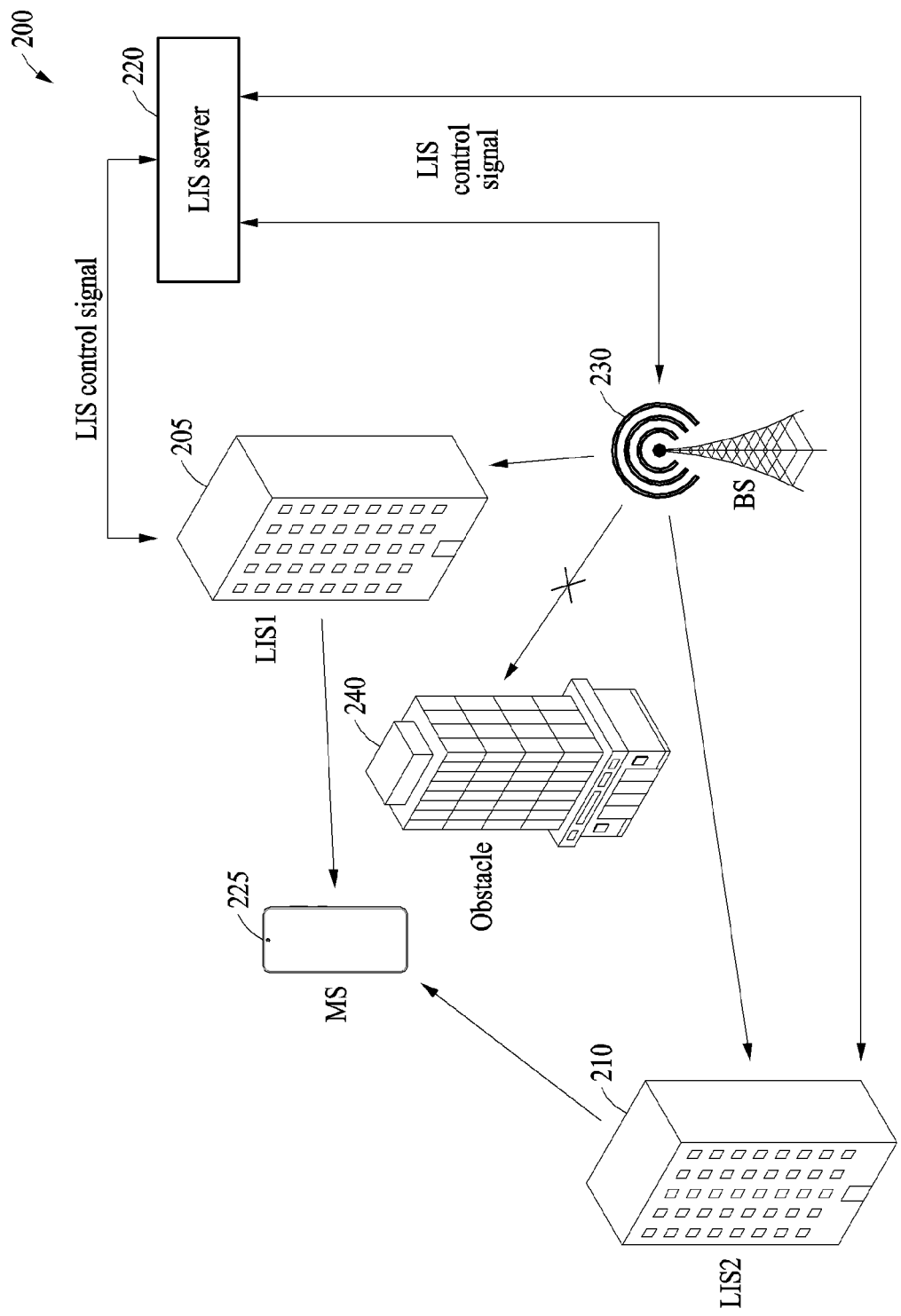
FIG. 2 illustrates a communication system using a large intelligent surface (LIS) according to an embodiment of the disclosure.

FIG. 2 illustrates a communication system using a large intelligent surface (LIS) according to an embodiment of the disclosure.

Referring to FIG. 2, a wireless communication system 200 (hereinafter, a communication system) using an LIS according to an example embodiment may include a terminal 225 (e.g., the electronic device 101 of FIG. 1) configured to request a data service, a base station (BS) 230 configured to provide the data service to the terminal 225, an LIS by which a data service signal provided from the base station 230 is reflected, and an LIS server 220 configured to control the LIS. The data service signal may refer to at least one of a downlink data transmission signal and an uplink data transmission signal. A representation of the LIS may be replaced by a representation of a reconfigurable intelligent surface (RIS) or an intelligent reflecting surface (IRS).

FIG. 2 illustrates buildings 205 and 210 each with an LIS attached (or mounted or installed) to an exterior wall of each building. However, it is provided as an example only and the LIS may be designed in various forms other than a form attached to a building.

Although FIG. 2 illustrates that a single LIS server 220 controls all of LISs, for example, LIS1 and LIS2, attached to the buildings 205 and 210, it is provided as an example only. An individual LIS server may be present to control the LIS attached to each corresponding building 205 or building 210.

In an example embodiment, the wireless communication system 200 may use a millimeter wave (mmWave) (e.g., 10 to 100 gigahertz (GHz)) frequency or a terahertz (e.g., 0.1 to 10 terahertz (THz)) frequency to secure a larger frequency bandwidth. Also, the wireless communication system 200 may employ beamforming technology using a multi-antenna to improve the power efficiency of wireless communication. A transmission side of transmitting a signal may improve directivity by concentrating a signal transmitted from each antenna in a specific direction (i.e., space) using a plurality of antennas (e.g., an array antenna) and a reception side of receiving the corresponding signal may increase sensitivity of a received signal that comes in the corresponding specific direction by concentrating reception of a radio wave in the specific direction and may block an interference signal by excluding a signal that comes in another direction.

In an example embodiment, an LIS may include a plurality of meta-surfaces and a beamforming function may be performed using the plurality of meta-surfaces. A radio wave incident to the LIS may be received and reflected by the plurality of meta-surfaces. The plurality of meta-surfaces included in the LIS may be controlled by the LIS server 220. For example, density of the plurality of meta-surfaces may be adjusted by a stimulation (e.g., an electrical stimulation) generated from the LIS server 220. The LIS server 220 may adjust a reflection and a refraction by transforming a wavelength form of an incident radio wave according to a generalized Snell's law by adjusting the density of the plurality of meta-surfaces. The LIS server 220 may concentrate a radio wave reception direction or may concentrate a reflected radio wave by appropriately controlling the density of the plurality of meta-surfaces included in the LIS.

Since a free space loss (FSL) is very large and a number of multipaths significantly decreases in a very high frequency bandwidth, such as an mmWave frequency or a THz frequency, it may be important to minimize a pathloss by securing a line-of-sight (LOS).

In a very high frequency communication environment, the LIS may improve communication performance of a very high frequency bandwidth by forming an additional multipath between the base station 230 and the terminal 225.

For example, referring to FIG. 2, a data service signal transmitted from the base station 230 may not be directly delivered to the terminal 225 due to an obstacle 240. The data service signal transmitted from the base station 230 may be reflected by the LIS attached to the exterior wall of the building 205 or building 210 and then delivered to the terminal 225, instead of being directly delivered to the terminal 225.

In an example embodiment, the terminal 225 may transmit preamble signals to receive a data service. The preamble signals may be transmitted through beams each with a different transmission time and transmission direction. The preamble signals may be identified based on identification information for identifying the preamble signals. Identification information of a preamble signal may include one of a beam index and an identification ID of the corresponding preamble signal. In an example embodiment, each of the preamble signals may include a unique identification ID of each corresponding preamble signal. In another example embodiment, each of preamble signals transmitted through beams may be identified using a beam index for identifying a corresponding beam. In an example embodiment, preamble signals may include preamble information.

In an example embodiment, the LIS server 220 may receive at least one preamble signal among preamble signals transmitted from the terminal 225 through the LIS attached to the exterior wall of the building 205 or building 210, and may determine an angle of incidence at which each preamble signal is received. A radio wave reception direction of the LIS may be set by the LIS server 220 and an angle of incidence at which a corresponding preamble signal is received may be determined based on the radio wave reception direction of the LIS.

For example, the LIS server 220 may receive a first preamble signal transmitted from the terminal 225 through the LIS, for example, LIS1, attached to the building 205 and may receive a second preamble signal transmitted from the terminal 225 through the LIS, for example, LIS2, attached to the building 210. The LIS server 220 may determine an angle of incidence at which the first preamble signal is received and an angle of incidence at which the second preamble signal is received.

In an example embodiment, the LIS server 220 may match and store preamble information included in a preamble signal being received, identification information of the corresponding preamble signal (e.g., an identification ID or a beam index of the preamble signal), and an angle of incidence at which the preamble signal is received.

Preamble signals transmitted from the terminal 225 may be reflected by the LIS. The preamble signals transmitted from the terminal 225 may be delivered to the base station 230 through a multipath. The base station 230 may receive preamble signals that include the preamble signal reflected by the LIS and are delivered through the multipath. The base station 230 may extract preamble information from the received preamble signals and may determine the terminal 225 to which the data service is to be provided.

In an example embodiment, the base station 230 may determine a preamble signal having the largest reception power among the received preamble signals. That the reception power is largest may represent that a signal is delivered with the best efficiency among a plurality of radio wave delivery paths.

In an example embodiment, the base station 230 may transmit identification information of the determined preamble signal to the LIS server 220. When a preamble signal corresponding to the identification information received from the base station 230 is present in at least one preamble signal received through the LIS, the LIS server 220 may control the LIS such that an angle of reflection at which a data service signal transmitted from the base station 230 is reflected by the LIS corresponds to an angle of incidence at which the preamble signal of the corresponding identification information is incident.

Since the LIS server 220 controls the angle of reflection of the LIS, the data service signal transmitted from the base station 230 may be further better delivered to the terminal 225.

For example, in FIG. 2, the base station 230 may receive the first preamble signal reflected by the LIS attached to the building 205 and the second preamble signal reflected by the LIS attached to the building 210. Here, when reception power of the first preamble signal between two preamble signals is larger, the base station 230 may deliver an identification ID of the first preamble signal or a beam index of the first preamble signal to the LIS server 220 as identification information of the first preamble signal. The LIS server 220 may control the LIS (e.g., the LIS attached to the building 205) such that the angle of reflection at which the data service signal transmitted from the base station 230 is reflected by the LIS corresponds to the angle of incidence of the first preamble signal based on an angle of incidence of the first preamble signal corresponding to the identification information received from the base station 230 between the first and second preamble signals received from the terminal 225.

The base station 230 may transmit the data service signal in various directions and, when the data service signal is reflected by the LIS attached to the building 205, the data service signal with good signal quality may be delivered to the terminal 225.

Hereinafter, an LIS is described with reference to FIG. 3.

Figure 3:
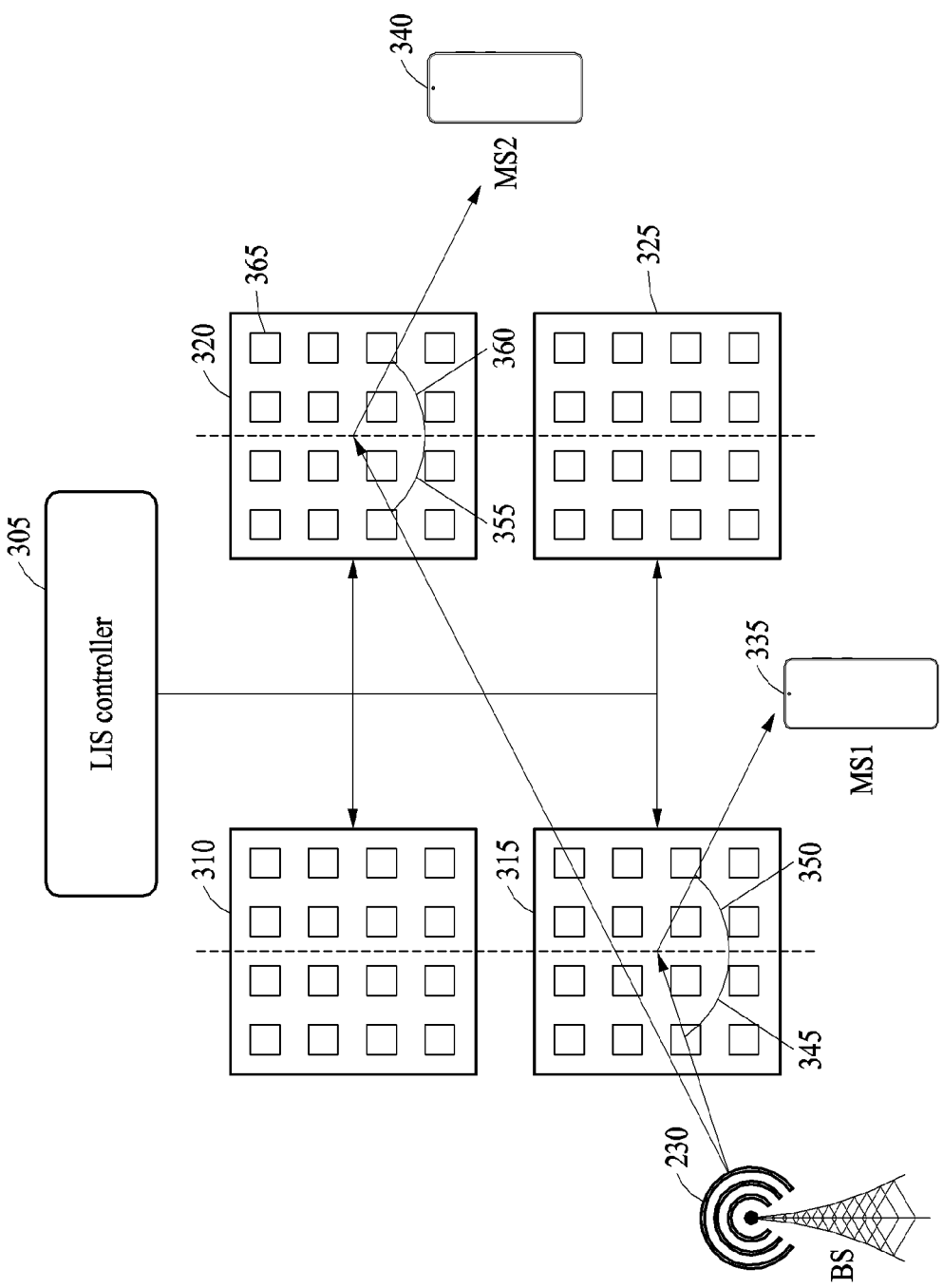
FIG. 3 illustrates an LIS included in a communication system according to an embodiment of the disclosure.

FIG. 3 illustrates an LIS included in a communication system according to an embodiment of the disclosure.

Referring to FIG. 3, a plurality of LISs 310, 315, 320, and 325, a plurality of meta-surfaces (e.g., a meta-surface 365) included in each of the plurality of LISs 310, 315, 320, and 325, an LIS controller 305 configured to control the plurality of LISs 310, 315, 320, and 325, the base station (BS) 230, and terminals, for example, a first terminal (MS1) 335 and a second terminal (MS2) 340, configured to receive a signal transmitted from the base station 230 and reflected by the LISs 315 and 320. In an example embodiment, the LIS controller 305 may be included in an LIS server (e.g., the LIS server 220 of FIG. 2).

The plurality of LISs 310, 315, 320, and 325 of FIG. 3 may be attached to an exterior wall of a single building (e.g., the building 205 of FIG. 2). Although FIG. 3 illustrates four LISs, it is provided as an example for concise description. If necessary, the wireless communication system 200 may include a larger number of LISs. The plurality of LISs 310, 315, 320, and 325 may be arranged in a two-dimensional (2D) array form.

A data service signal transmitted from the base station 230 to provide a data service may be reflected by a meta-surface included in the LISs 310, 315, 320, 325 and then delivered to the corresponding terminal. For example, a data service signal for the first terminal 335 may be reflected by a meta-surface of the LIS 315 and delivered to the first terminal 335 at an angle of incidence 345 and an angle of reflection 350, and a data service signal for the second terminal 340 may be reflected by a meta-surface of the LIS 320 and delivered to the second terminal 340 at an angle of incidence 355 and an angle of reflection 360.

The LIS controller 305 may rearrange scattering particles on the meta-surface by applying an electrical stimulation on each of the LISs 310, 315, 320, and 325 and may control an angle of reflection (e.g., the angle of reflection 350, 360) at which a radio wave is reflected on the meta-surface.

Hereinafter, a communication method using an LIS is described with reference to FIG. 4.

Figure 4:
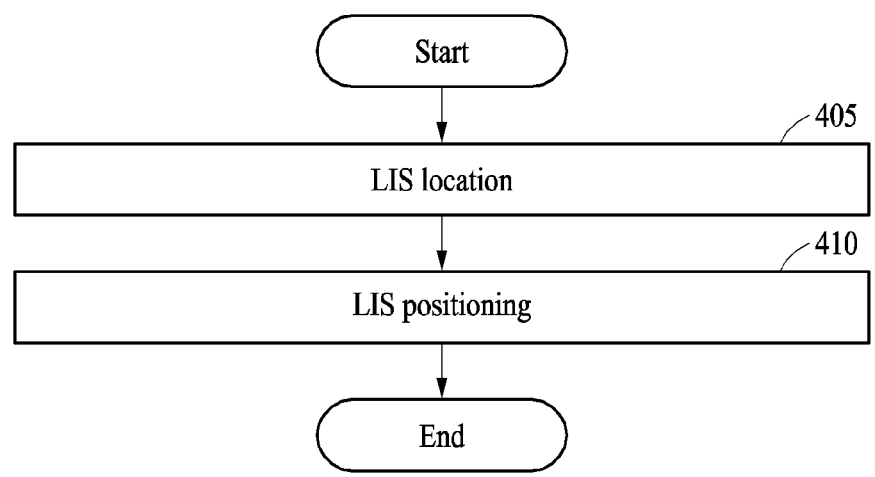
FIG. 4 is a flowchart illustrating a communication method using an LIS according to an embodiment of the disclosure.

FIG. 4 is a flowchart illustrating a communication method using an LIS according to an embodiment of the disclosure.

Referring to FIG. 4, the communication method using the LIS according to an example embodiment may include a location operation (operation 405) in which an LIS server (e.g., the LIS server 220 of FIG. 2) finds an LIS with best reception quality of a preamble signal transmitted from a terminal (e.g., the terminal 225 of FIG. 2) among a plurality of LISs (e.g., the plurality of LISs 310, 315, 320, and 325 of FIG. 3) in an initial access stage and a positioning operation (operation 410) in which the LIS server controls an angle of reflection at which a data service signal transmitted from a base station (e.g., the base station 230 of FIG. 2) is reflected by each of the plurality of LISs.

In operation 405, the LIS server may set radio wave reception directions of the plurality of LISs such that each of the plurality of LISs may receive a radio wave in a different direction. The terminal may transmit preamble signals to receive a data service from the base station and the LIS server may receive and reflect at least one preamble signal among preamble signals transmitted from the terminal through the plurality of LISs. Hereinafter, description is made for concise description based on an example of using a first preamble signal that is one of at least one preamble signal received through the plurality of LISs.

The LIS server may tag and store preamble information of the first preamble signal received through each of the plurality of LISs, identification information of the first preamble signal, and reception information of each of the plurality of LISs. Identification information of a preamble signal may include one of an identification ID and a beam ID of the preamble signal. In an example embodiment, the identification ID of the preamble signal refers to a unique ID of the preamble signal and may be included in each preamble signal. In another example embodiment, the preamble signals may be identified using a beam index for identifying a beam used to deliver each preamble signal, without including a separate identification ID.

In an example embodiment, reception information of each of the plurality of LISs may include information on an angle of incidence corresponding to a radio wave reception direction of each LIS and delay time information and reception power information of the first preamble signal received through each LIS.

The LIS server may compare reception power of the first preamble signal received through each of the plurality of LISs, may determine an LIS corresponding to the largest reception power of the first preamble signal as a reference LIS for the first preamble signal, and may determine an angle of incidence of the reference LIS as a reference angle of incidence for the first preamble signal.

In operation 410, the LIS server may determine the angle of reflection at which the data service signal transmitted from the base station is reflected by each of the plurality of LISs based on the reference angle of incidence determined in operation 405.

For example, the base station may receive preamble signals delivered through a multipath from the terminal and may transmit identification information of the first preamble signal having the largest reception power among the received preamble signals to the LIS server. The LIS server may receive the identification information of the first preamble signal from the base station.

The LIS server may determine the first preamble signal as the preamble signal corresponding to the identification information received from the base station, among the one or more preamble signals received by the LIS server. The LIS server may control the plurality of LISs such that the angle of reflection at which the data service signal transmitted from the base station is reflected by each of the plurality of LISs corresponds to the reference angle of incidence determined in operation 405 for the first preamble signal, based on the reference angle of incidence of the first preamble signal.

In an example embodiment, when a distance between each of the plurality of LISs and the terminal is distant, the LIS server may control an angle of reflection of each of the plurality of LISs to correspond to the reference angle of incidence. When the distance is close, the LIS server may correct the angle of reflection of each of the plurality of LISs based on the reference angle of incidence and may control the reflected data service signal to direct the terminal.

Hereinafter, operations 405 and 410 are further description with reference to FIGS. 5A and 5B.

Figure 5A:
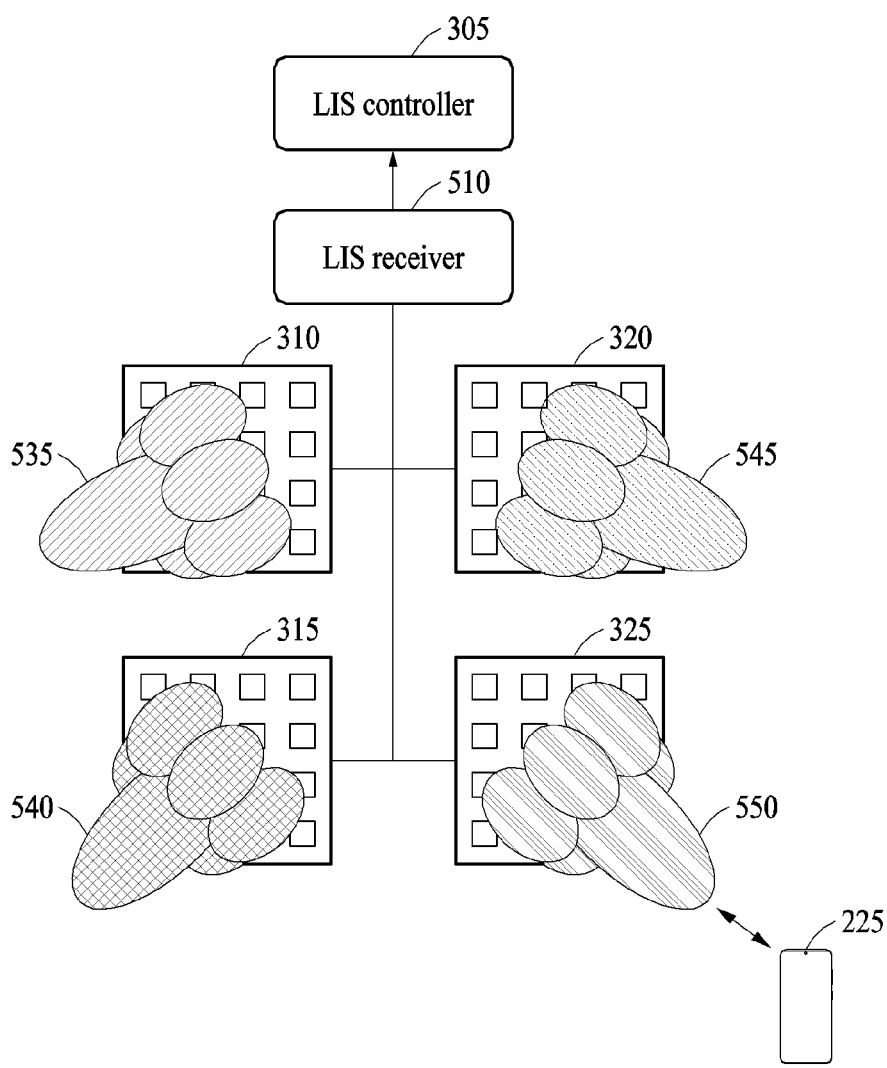
FIG. 5A illustrates a location operation of a communication system according to an embodiment of the disclosure.

FIG. 5A illustrates a location operation of a communication system according to an embodiment of the disclosure.

Figure 5B:
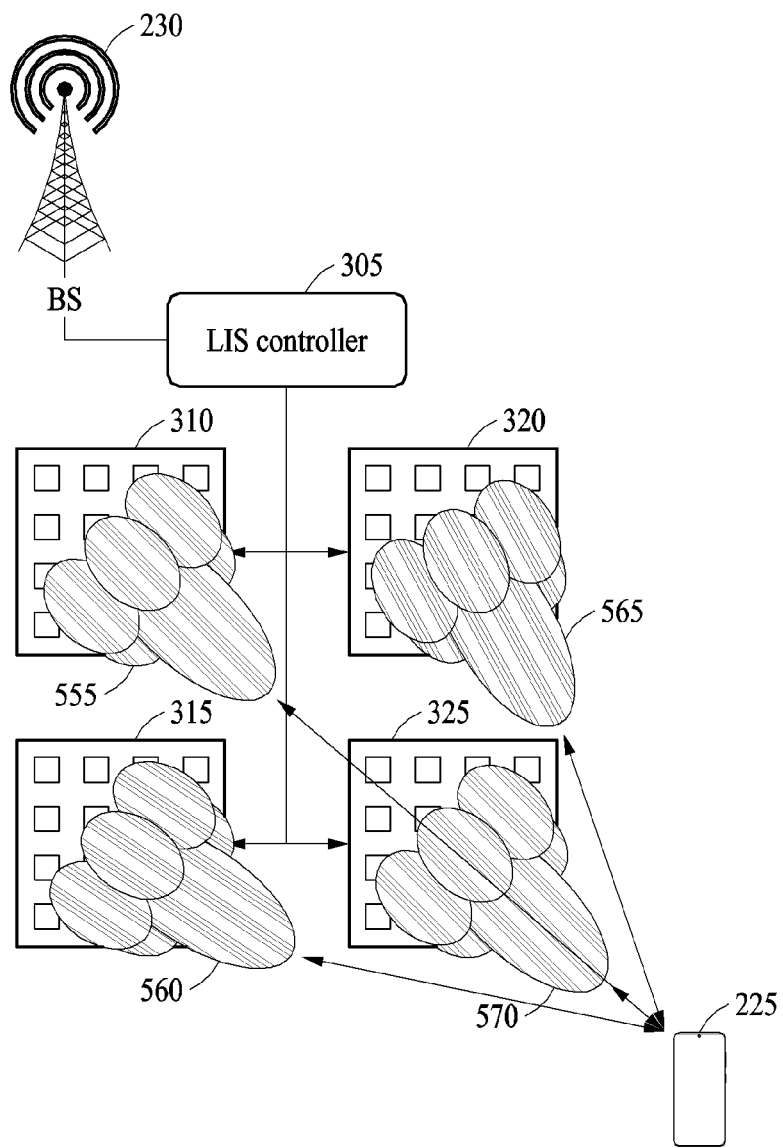
FIG. 5B illustrates a positioning operation of a communication system according to an embodiment of the disclosure.

FIG. 5B illustrates a positioning operation of a communication system according to an embodiment of the disclosure.

Referring to FIG. 5A, a plurality of LISs 310, 315, 320, and 325, a terminal 225 configured to transmit a first preamble signal, an LIS receiver 510 configured to receive an analog signal through the plurality of LISs 310, 315, 320, and 325 and to convert the analog signal to a digital signal, and the LIS controller 305 are illustrated. Here, the LIS receiver 510 and the LIS controller 305 may be included in the LIS server (e.g., the LIS server 220 of FIG. 2).

Referring to FIG. 5A, the plurality of LISs 310, 315, 320, and 325 may be controlled by the LIS controller 305 and may be set to receive a radio wave in different directions 535, 540, 545, and 550, respectively. However, it is provided as an example only. In another example embodiment, at least some of the plurality of LISs 310, 315, 320, and 325 may be set to receive a radio wave in the same direction.

The terminal 225 may be beamformed in a specific direction through a multi-antenna of the terminal 225 and may transmit the first preamble signal. The terminal 225 may be beamformed in various directions and may transmit preamble signals. Here, the first preamble signal may be one of the preamble signals transmitted from the terminal 225.

Each of the plurality of LISs 310, 315, 320, and 325 may receive at least one preamble signal among the preamble signals transmitted from the terminal 225. For example, each of the plurality of LISs 310, 315, 320, and 325 may receive the first preamble signal transmitted from the terminal 225. Although the following description is made for concise description based on an example of using the first preamble signal, an operation performed for the first preamble signal may be performed alike on at least one preamble signal received through the plurality of LISs 310, 315, 320, and 325.

The first preamble signal received through each of the plurality of LISs 310, 315, 320, and 325 may be delivered to the LIS controller 305 through the LIS receiver 510. The LIS receiver 510 may demodulate the first preamble signal received through each of the plurality of LISs 310, 315, 320, 325 and may convert the same to a digital signal. The LIS controller 305 may receive, from the LIS receiver 510, and process the first preamble signal converted to the digital signal.

In an example embodiment, the LIS controller 305 may tag and store preamble information included in the first preamble signal received through each of the LISs 310, 315, 320, and 325 and identification information of the first preamble signal for each of the LISs 310, 315, 320, and 325, together with information on an angle of incidence corresponding to each of the radio wave reception directions 535, 540, 545, and 550 of the respective LISs 310, 315, 320, and 325, and delay time information and reception power information of the first preamble signal received through each of the LISs 310, 315, 320, and 325.

For example, the LIS controller 305 may tag preamble information and identification information included in the first preamble signal received through the LIS 325, and information on the angle of incidence corresponding to the radio wave reception direction 550 of the LIS 325, and delay time information and reception power information of the first preamble signal received through the LIS 325 as information on the LIS 325, and may store the same in the LIS server 220. The preamble information included in the first preamble signal may include identification information of the terminal 225 that requests a data service.

All of the plurality of LISs 310, 315, 320, and 325 may receive the first preamble signal, but may differ from each other in terms of reception power. The LIS 325 of which the radio wave reception direction is directed toward the terminal 225 may receive the first preamble signal with relatively high reception power and the other LISs 310, 315 and 320 may receive the first preamble signal with reception power lower than that of the LIS 325 or may fail in receiving the first preamble signal. For the LIS 310 that fails in receiving the first preamble signal, there is no reception information of the LIS 310 on the first preamble signal. Therefore, the reception information of the LIS 310 on the first preamble signal may not be stored in the LIS server 220.

The LIS server 220 may compare the reception power of the first preamble signal received through each of the plurality of LISs 310, 315, 320, and 325, may determine the LIS 325 having the largest reception power of the first preamble signal as a reference LIS for the first preamble signal, and may determine an angle of incidence corresponding to the radio wave reception direction 550 of the LIS 325 as a reference angle of incidence for the first preamble signal.

Referring to FIG. 5B, the LIS server (e.g., the LIS server 220 of FIG. 2) may control an angle of reflection at which a data service signal transmitted from the base station 230 to a corresponding terminal 225 is reflected by each of the plurality of LISs 310, 315, 320, and 325 based on the reference angle of incidence determined in FIG. 5A.

Referring to FIG. 5B, reflection directions 555, 560, 565, and 570 in which the angle of reflection at which the data service signal transmitted from the base station 230 is reflected by the plurality of LISs 310, 315, 320, and 325 are controlled based on the reference angle of incidence determined in FIG. 5A.

In an example embodiment, the LIS controller 305 may receive identification information of the first preamble signal from the base station 230. The LIS controller 305 and the base station 230 may be connected in wired or wireless manner.

The LIS controller 305 may control the plurality of LISs 310, 315, 320, and 325 such that the angle of reflection at which the data service signal transmitted from the base station 230 is reflected by each of the plurality of LISs 310, 315, 320, and 325 corresponds to the reference angle of incidence in FIG. 5A for the first preamble signal, based on the reference angle of incidence of the first preamble signal corresponding to the received preamble identification information.

In an example embodiment, when a distance between each of the plurality of LISs 310, 315, 320, and 325 and the terminal 225 is distant, the LIS controller 305 may control the angle of reflection of each of the plurality of LISs 310, 315, 320, and 325 to be the same. When the distance between each of the plurality of LISs 310, 315, 320, and 325 and the terminal 225 is close, the LIS controller 305 may correct the angle of reflection of each of the plurality of LISs 310, 315, 320, and 325, and control the reflected data service signal to be directed toward the terminal 225.

For example, in the example of FIG. 5B, the LIS controller 305 may determine that the distance between each of the plurality of LISs 310, 315, 320, and 325 and the terminal 225 is close and may correct the angle of reflection of each of the LISs 310, 315, and 320 and control the LISs 310, 315, and 320 such that the data service signal transmitted from the base station 230 may be reflected in the reflection directions 555, 560, and 565 in which the terminal 225 is present.

When the LIS controller 305 determines that the distance between each of the plurality of LISs 310, 315, 320, and 325 and the terminal 225 is distant, the LIS controller 305 may control reflection directions of the plurality of LISs 310, 315, 320, and 325 to be the same as the reflection direction 570.

In an example embodiment, whether the distance between each of the plurality of LISs 310, 315, 320, and 325 and the terminal 225 is close may be determined based on reception power of the first preamble signal of each of the LISs 310, 315, 320, and 325 stored in the LIS server 220. For example, the LIS controller 305 may determine the distance between each of the plurality of LISs 310, 315, 320, and 325 and the terminal 225 based on the largest reception power among reception powers of the first preamble signal of the terminal 225 received through each of the plurality of LISs 310, 315, 320, and 325. For example, the LIS controller 305 may determine the distance between each of the plurality of LISs 310, 315, 320, and 325 and the terminal 225 based on the reception power of the first preamble signal received through the reference LIS, for example, the LIS 325, of the terminal 225.

When the determined distance is greater than or equal to a threshold, the LIS controller 305 may determine that the distance is distant. When the determined distance is less than the threshold, the LIS controller 305 may determine that the distance is close.

Hereinafter, a method of correcting the angle of reflection of each of the LISs 310, 315, 320, and 325 when the distance between each of the plurality of LISs 310, 315, 320, and 325 and the terminal 225 is close is described with reference to FIG. 6.

Figure 6:
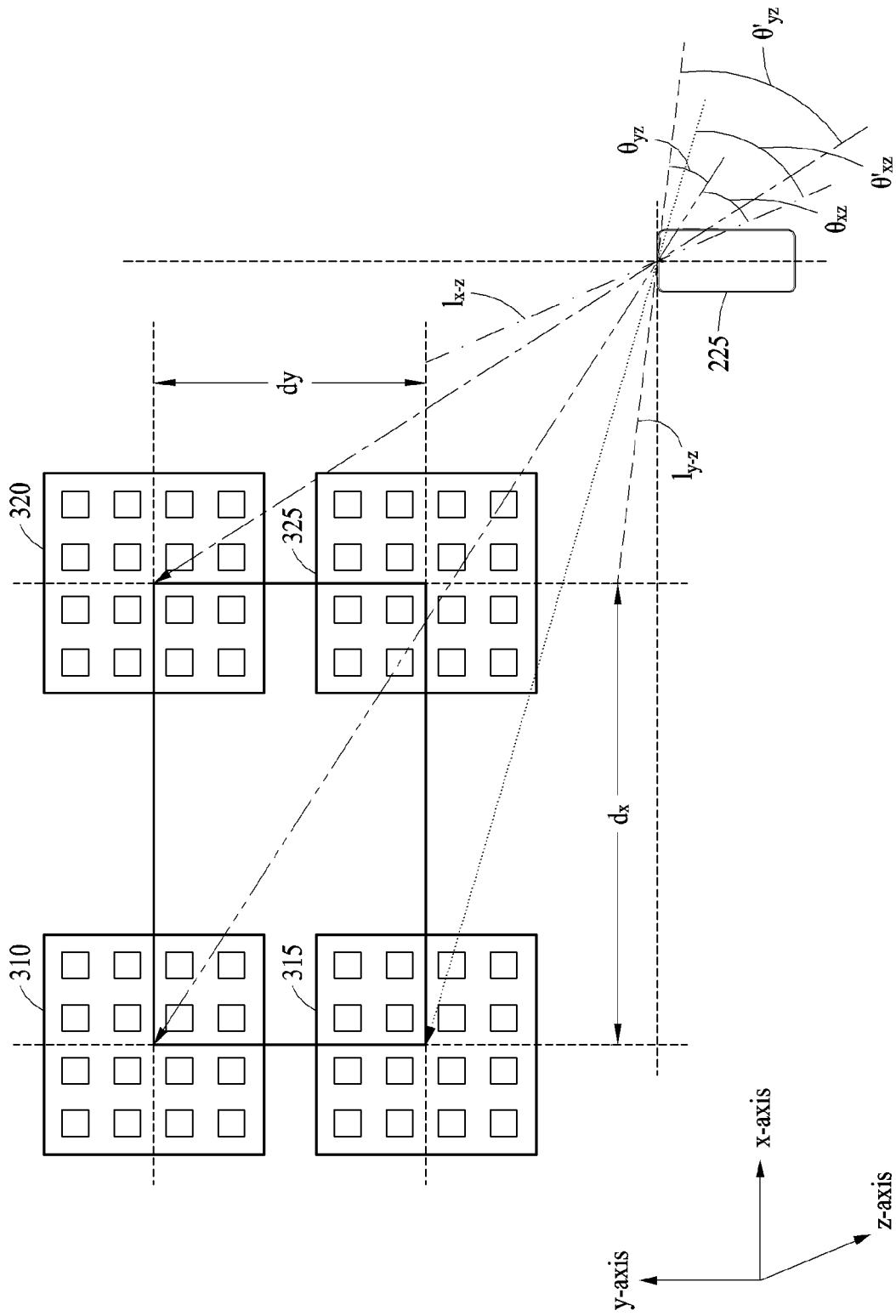
FIG. 6 illustrates a detailed positioning operation of a communication system according to an embodiment of the disclosure.

FIG. 6 illustrates a detailed positioning operation of a communication system according to an embodiment of the disclosure.

Referring to FIG. 6, a model in a three-dimensional (3D) planar form between a plurality of LISs 310, 315, 320, and 325 and the terminal 225 is illustrated. The plurality of LISs 310, 315, 320, and 325 may be arranged in a two-dimensional (2D) array form on an x-y plane with a horizontal interval of $d_x$ on the x-axis and a vertical interval of $d_y$ on the y-axis.

In the example of FIG. 6, the LIS server 220 may perform operation 405 corresponding to the location operation of FIG. 4 and may determine the LIS 325 as a reference LIS for the first preamble signal. The LIS server 220 may perform operation 410 corresponding to the positioning operation of FIG. 4 and may determine that a distance between each of the plurality of LISs 310, 315, 320, and 325 and the terminal 225 is close.

When it is determined that the distance between each of the plurality of LISs 310, 315, 320, and 325 and the terminal 225 is close, the angle of reflection of each of the plurality of LISs 310, 315, and 320 excluding the reference LIS may need to be corrected to correspond to the reflection directions 555, 560, and 565 based on the reference angle of incidence for the first preamble signal determined in operation 405 of FIG. 4 such that a radio wave incident to each of the plurality of LISs 310, 315, 320, and 325 is reflected and delivered to the terminal 225.

In an example embodiment, the angle of reflection of each of the plurality of LISs 310, 315, and 320 may be corrected based on a distance between the plurality of LISs 310, 315, 320, and 325 and the reference angle of incidence for the first preamble signal.

Referring to FIG. 6, angles of incidence of a radio wave incident from a terminal 225 to the reference LIS, for example, the LIS 325 for the first preamble signal are referred to as $\theta_{xz}$ and $\theta_{xy}$, respectively, on a plane on which the terminal 225 is projected on the x-z plane and a plane on which the terminal 225 is projected on the y-z plane. A distance perpendicular to the terminal 225 and the x-axis on the x-z plane is $l_{xz}$, and a distance perpendicular to the terminal 225 and the y-axis on the y-z plane is $l_{yz}$.

With the assumption that an angle of reflection from the LIS 315 on the x-z plane to be corrected to the terminal 225 is $\theta'_{xz}$ and an angle of reflection from the LIS 320 on the y-z plane to the terminal 225 is $\theta'_{yz}$, the LIS server 220 may perform a calculation according to a trigonometric method as follows.

$$\theta'_{xz} = \tan^{-1}\left(\frac{d_x}{l_{xz}} + \tan\theta_{xz}\right) \qquad \text{Equation 1}$$

$$\theta'_{yz} = \tan^{-1}\left(\frac{d_y}{l_{yz}} + \tan\theta_{yz}\right) \qquad \text{Equation 2}$$

In Equation 1, $\theta'_{xz}$ denotes the angle of reflection from the LIS 315 on the x-z plane to the terminal 225, $d_x$ denotes an x-axis interval between the LIS 315 and the LIS 325, $l_{xz}$ denotes the distance perpendicular to the terminal 225 and the x-axis on the x-z plane, and $\theta_{xz}$ denotes the angle of incidence of radio wave incident from the terminal 225 to the reference LIS, for example, the LIS 325, for the first preamble signal on the plane on which the terminal 225 is projected on the x-z plane.

In Equation 2, $\theta'_{yz}$ denotes the angle of reflection from the LIS 320 on the y-z plane to the terminal 225, $d_y$ denotes a y-axis interval between the LIS 320 and the LIS 325, $l_{yz}$ denotes the distance perpendicular to the terminal 225 and the y-axis on the y-z plane, and $\theta_{yz}$ denotes the angle of incidence of radio wave incident from the terminal 225 to the reference LIS, for example, the LIS 325, for the first preamble signal on the plane on which the terminal 225 is projected on the y-z plane.

If the x-axis interval and the y-axis interval between the plurality of LISs 310, 315, 320, and 325 are the same, Equation 1 and Equation 2 may be generalized to Equation 3 and Equation 4, respectively.

$$\theta'_{xz} = \tan^{-1}\left(\frac{d_x}{l_{xz}}(n_x - 1) + \tan\theta_{xz}\right) \qquad \text{Equation 3}$$

$$\theta'_{yz} = \tan^{-1}\left(\frac{d_y}{l_{yz}}(n_y - 1) + \tan\theta_{yz}\right) \qquad \text{Equation 4}$$

In Equation 3, $\theta'_{xz}$ denotes the angle of reflection from the LIS 315 on the x-z plane to the terminal 225, $d_x$ denotes the x-axis interval between the LIS 315 and the LIS 325, $l_{xz}$ denotes the distance perpendicular to the terminal 225 and the x-axis on the x-z plane, $\theta_{xz}$ denotes the angle of incidence of radio wave incident from the terminal 225 to the reference LIS, for example, the LIS 325, for the first preamble signal on the plane on which the terminal 225 is projected on the x-z plane, and $n_x$ denotes a number of LISs provided to the x-axis. For example, in FIG. 6, $n_x$ is 2.

In Equation 4, $\theta'_{yz}$ denotes the angle of reflection from the LIS 320 on the y-z plane to the terminal 225, $d_y$ denotes the y-axis interval between the LIS 320 and the LIS 325, $l_{yz}$ denotes the distance perpendicular to the terminal 225 and the y-axis on the y-z plane, $\theta_{yz}$ denotes the angle of incidence of radio wave incident from the terminal 225 to the reference LIS, for example, the LIS 325, for the first preamble signal on the plane on which the terminal 225 is projected on the y-z plane, and $n_y$ denotes a number of LISs provided to the y-axis. For example, in FIG. 6, $n_y$ is 2.

With the assumption that the terminal 225 and the LISs 310, 315, 320, and 325 are present on a line-of-sight (LOS), the distance ($l_{xz}$) between the terminal 225 and the x-z plane and the distance ($l_{yz}$) between the terminal 225 and the y-z plane may be calculated using an FSL model. The FSL model may be represented as the following Equation 5.

$$FSL = D_t D_r \left(\frac{\lambda}{4\pi d}\right)^2 \qquad \text{Equation 5}$$

Here, FSL denotes free space loss, $D_t$ and $D_r$ denote a directivity gain of a transmission antenna and a directivity gain of a reception antenna, respectively, $\lambda$ denotes a wavelength of a signal, and d denotes a distance between an LIS and the terminal 225. For example, d denotes the distance between the reference LIS, for example, the LIS 325, for the first preamble signal and the terminal 225.

Calculating the reception power ($P_r$) of the LIS using the FSL model, it may be represented as Equation 6.

$$P_r = P_t D_t D_r \left(\frac{\lambda}{4\pi d}\right)^2 \qquad \text{Equation 6}$$

In Equation 6, $P_t$ denotes a transmission power (e.g., transmission power of the first preamble signal) of the terminal 225, $P_r$ denotes a reception power (e.g., reception power of the first preamble signal) of the reference LIS, for example, the LIS 325, for the first preamble signal, $D_t$ and $D_r$ denote the directivity gain of the transmission antenna and the directivity gain of the reception antenna, respectively, $\lambda$ denotes the wavelength of the signal, and d denotes the distance between the reference LIS, for example, the LIS 325, for the first preamble signal and the terminal 225.

In general, since the terminal 225 transmits a signal according to a target power set in the base station 230 during 5G communication, a value of $P_t$ may be known by the wireless communication system 200. If the reception power through the LIS of the first preamble signal transmitted from the terminal 225 is $P_r$, the distance (d) may be represented as Equation 7.

$$d = \frac{\lambda}{4\pi}\sqrt{\frac{P_t}{P_r}D_t D_r} \qquad \text{Equation 7}$$

In Equation 7, $D_t$ and $D_r$ denote the directivity gain of the transmission antenna and the directivity gain of the reception antenna, respectively, $\lambda$ denotes the wavelength of the signal, d denotes the distance between the reference LIS, for example, the LIS 325, for the first preamble signal and the terminal 225, $P_t$ denotes the transmission power of the first preamble signal of the terminal 225, and $P_r$ denotes the reception power of the first preamble signal through the reference LIS, for example, the LIS 325, for the first preamble signal.

The distance ($l_{xz}$) and the distance ($l_{yz}$) using a trigonometric function are relational expressions including the distance (d) and may be represented as Equation 8 and Equation 9, respectively.

$$l_{xz} = d \sin \theta_{xz} \qquad \text{Equation 8}$$

$$l_{yz} = d \sin \theta_{yz} \qquad \text{Equation 9}$$

In Equation 8, $l_{xz}$ denotes the distance perpendicular to the terminal 225 and the x-axis on the x-z plane, d denotes the distance between the reference LIS, for example, the LIS 325, for the first preamble signal and the terminal 225, and $\theta_{xz}$ denotes the angle of incidence of radio wave incident from the terminal 225 to the reference LIS, for example, the LIS 325, for the first preamble signal on the plane on which the terminal 225 is projected on the x-z plane.

In Equation 9, $l_{yz}$ denotes the distance perpendicular to the terminal 225 and the y-axis on the y-z plane, d denotes the distance between the reference LIS, for example, the LIS 325, for the first preamble signal and the terminal 225, and $\theta_{yz}$ denotes the angle of incidence of radio wave incident from the terminal 225 to the reference LIS, for example, the LIS 325, for the first preamble signal on the plane on which the terminal 225 is projected on the y-z plane.

In an example embodiment, the LIS server 220 may correct the angle of reflection of each of the plurality of LISs 310, 315, and 320 using Equation 1 to Equation 9 and may control the plurality of LISs 310, 315, and 320 according to the corrected angle of reflection. The LIS server 220 may correct the angle of reflection of each of the plurality of LISs 310, 315, and 320 and may deliver the data service signal transmitted from the base station 230 to the terminal 225 with high efficiency.

Hereinafter, an example embodiment of providing communication for a plurality of terminals in the wireless communication system 200 is described with reference to FIGS. 7A and 7B.

Figure 7A:
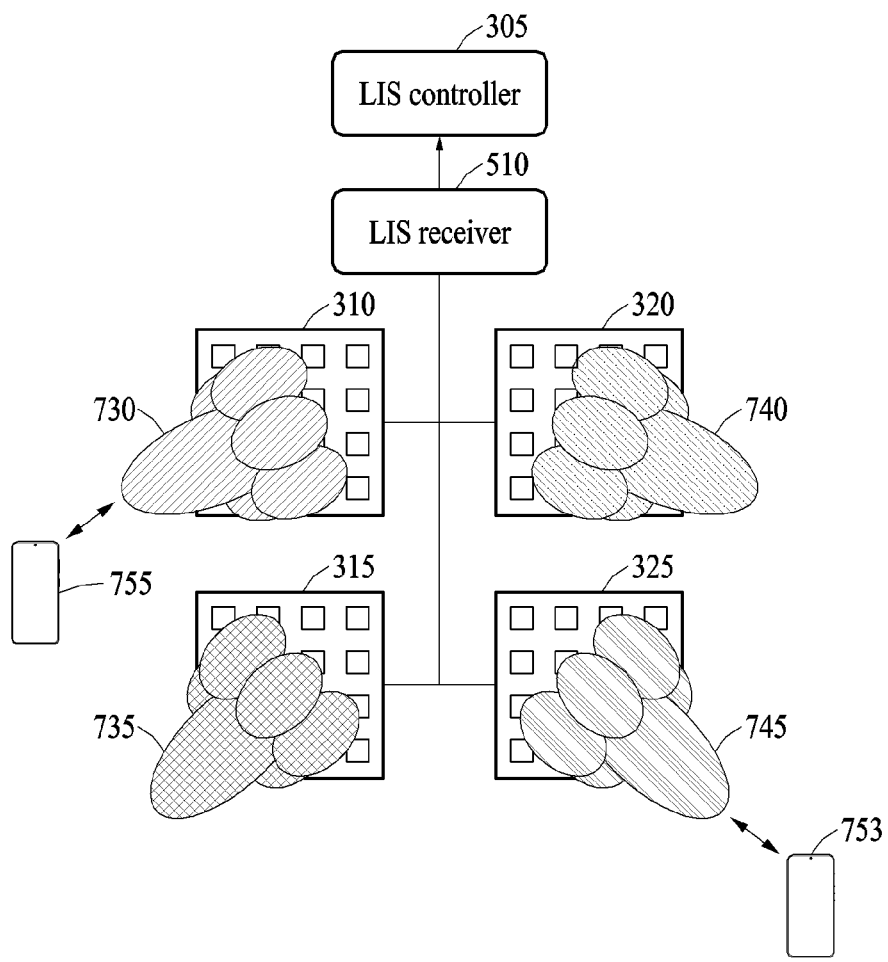
FIG. 7A illustrates a location method for a plurality of terminals of a communication system according to an embodiment of the disclosure.
Figure 7B:
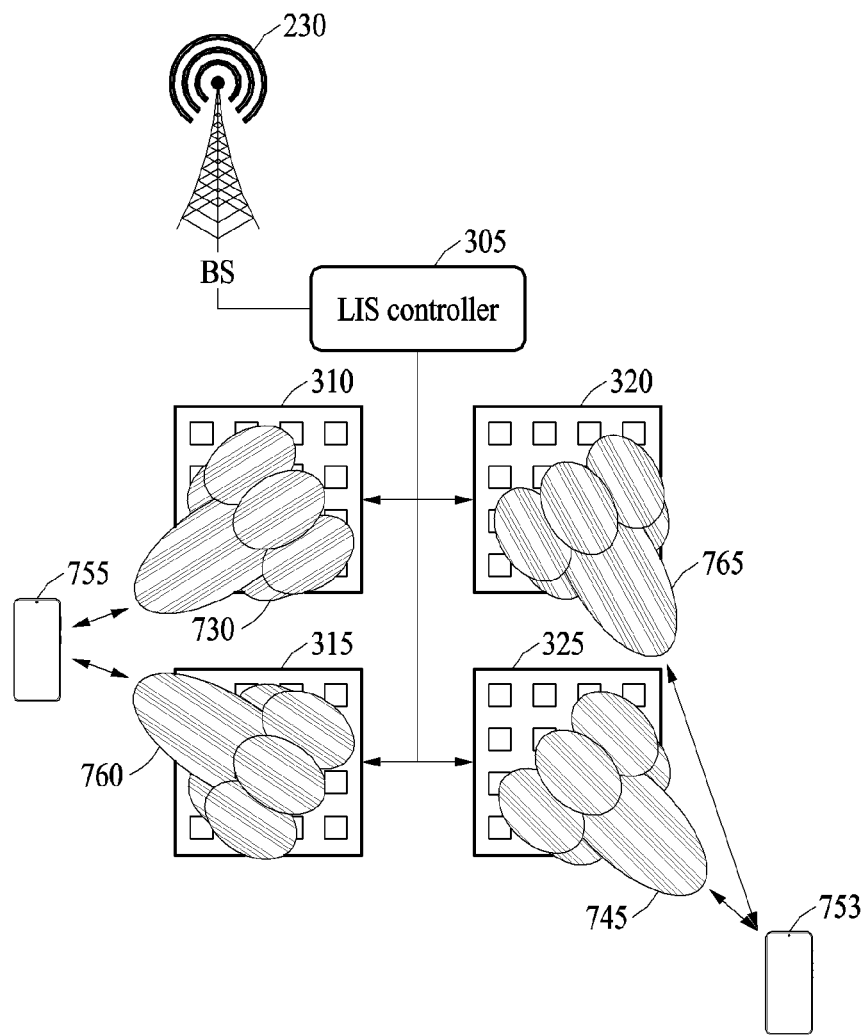
FIG. 7B illustrates a positioning method for a plurality of terminals of a communication system according to an embodiment of the disclosure.

FIGS. 7A and 7B illustrate a location method and a positioning method for a plurality of terminals in a communication system according to various embodiments of the disclosure.

Referring to FIG. 7A, a plurality of LISs 310, 315, 320, and 325, the LIS controller 305 configured to control the plurality of LISs 310, 315, 320, and 325, a first terminal 753 configured to transmit a first preamble signal, and a second terminal 755 configured to transmit a second preamble signal are illustrated.

Referring to FIG. 7A, the plurality of LISs 310, 315, 320, and 325 may be controlled by the LIS controller 305 and set to receive a radio wave in different directions, for example, radio wave reception directions 730, 735, 740, and 745, respectively. However, it is provided as an example only. In another example embodiment, at least some of the plurality of LISs 310, 315, 320, and 325 may be set to receive a radio wave in the same direction.

The first terminal 753 may be beamformed in a specific direction through a multi-antenna of the first terminal 753 and may transmit the first preamble signal, and the second terminal 755 may be beamformed in a specific direction through a multi-antenna of the second terminal 755 and may transmit the second preamble signal.

The first preamble signal transmitted from the first terminal 753 may be received through the LISs 320 and 325 among the plurality of LISs 310, 315, 320, and 325, and the second preamble signal transmitted from the second terminal 755 may be received through the LISs 310 and 315 among the plurality of LISs 310, 315, 320, and 325.

Although the plurality of LISs 320 and 325 may receive the first preamble signal and the plurality of LISs 310 and 315 may receive the second preamble signal, they may differ from each other in terms of reception power. The LIS 325 of which the radio wave reception direction 745 is directed toward the first terminal 753 may receive the first preamble signal with relatively high reception power and the LIS 320 may receive the first preamble signal with reception power lower than that of the LIS 325.

The LIS 310 of which the radio wave reception direction 730 is directed toward the second terminal 755 may receive the second preamble signal with relatively high reception power and the LIS 315 may receive the second preamble signal with reception power lower than that of the LIS 310.

The plurality of LISs 320 and 325 and the plurality of LISs 310 and 315 have different radio wave reception directions and, here, the plurality of LISs 320 and 325 may not receive the second preamble signal and the plurality of LISs 310 and 315 may not receive the first preamble signal.

The first preamble signal and the second preamble signal received through at least some of the plurality of LISs 310, 315, 320, and 325 may be delivered to the LIS controller 305 through the LIS receiver 510. The LIS receiver 510 may demodulate the received first preamble signal and second preamble signal and may convert the same to a digital signal. The LIS controller 305 may receive, from the LIS receiver 510, and process the first preamble signal and the second preamble signal each converted to the digital signal.

In an example embodiment, the LIS controller 305 may tag and store preamble information included in the first preamble signal received through each of the LISs 320 and 325 and identification information of the first preamble signal for each of the LISs 320 and 325 with information on an angle of incidence corresponding to the radio wave reception direction 740, 745 of each LIS 320, 325, and delay time information and reception power information of the first preamble signal. For example, the LIS controller 305 may tag preamble information and identification information of the first preamble signal received through the LIS 325, information on the angle of incidence corresponding to the radio wave reception direction 745 of the LIS 325, and the delay time information and the reception power information of the first preamble signal received through the LIS 325, as information on the LIS 325 and may store the same in the LIS server 220. The preamble information included in the first preamble signal may include identification information of the first terminal 753 that requests a data service.

In an example embodiment, the LIS controller 305 may tag preamble information included in the second preamble signal received through each of the LISs 310 and 315 and identification information of the second preamble signal for each of the LISs 310 and 315 with information on the angle of incidence corresponding to the radio wave reception direction 730, 735, and delay time information and reception power information of the second preamble signal of each LIS 310 and 315. For example, the LIS controller 305 may tag preamble information and identification information of the second preamble signal received through the LIS 310, information on the angle of incidence corresponding to the radio wave reception direction 730 of the LIS 310, and delay time information and reception power information of the second preamble signal received through the LIS 310 as information on the LIS 310, and may store the same in the LIS server 220. The preamble information included in the second preamble signal may include identification information of the second terminal 755 that request the data service.

The LIS server 220 may compare the reception power of the first preamble signal received through each of the plurality of LISs 310, 315, 320, 325 and may determine the LIS 325 corresponding to the largest reception power of the first preamble signal as a first reference LIS for the first preamble signal, and may determine an angle of incidence corresponding to the radio wave reception direction 745 of the corresponding LIS 325 as a first reference angle of incidence for the first preamble signal.

The LIS server 220 may compare the reception power of the second preamble signal received through each of the plurality of LISs 310, 315, 320, and 325, may determine the LIS 310 corresponding to the largest reception power of the second preamble signal as a second reference LIS for the second preamble signal, and may determine an angle of incidence corresponding to the radio wave reception direction 730 of the corresponding LIS 310 as a second reference angle of incidence for the corresponding second preamble signal.

Referring to FIG. 7B, the LIS server 220 may control an angle of reflection at which a data service signal transmitted from the base station 230 to the corresponding first terminal 753 and second terminal 755 is reflected by each of the plurality of LISs 310, 315, 320, and 325, based on the first reference angle of incidence and the second reference angle of incidence.

FIG. 7B illustrates reflection directions 730, 760, 765, and 745 in which the angle of reflection at which the data service signal transmitted from the base station 230 is reflected by the plurality of LISs 310, 315, 320, and 325 are controlled based on the first reference angle of incidence and the second reference angle of incidence determined in FIG. 7A.

In an example embodiment, the base station 230 may receive preamble signals transmitted from the first terminal 753, including the first preamble signal, and may receive preamble signals transmitted from the second terminal 755, including the second preamble signal. The base station 230 may transmit identification information of the first preamble signal corresponding to the largest reception power among the preamble signals transmitted from the first terminal 753 to the LIS controller 305 and may transmit identification information of the second preamble signal corresponding to the largest reception power among the preamble signals transmitted from the second terminal 755 to the LIS controller 305.

In an example embodiment, the LIS controller 305 may receive the identification information of the first preamble signal and the identification information of the second preamble signal from the base station 230. The LIS controller 305 and the base station 230 may be connected in a wired or wireless manner.

In an example embodiment, when the LIS controller 305 receives identification information of at least two preamble signals from the base station 230, the LIS controller 305 may divide the plurality of LISs 310, 315, 320, and 325 into a number of groups corresponding to a number of the received identification information and may control the same for each group.

For example, the LIS controller 305 may control the LISs 320 and 325, such that an angle of reflection at which the data service signal transmitted from the base station 230 is reflected by each of the LISs 320 and 325 receiving the first preamble signal corresponds to the first reference angle of incidence of the first preamble signal, based on the identification information of the first preamble signal.

The LIS controller 305 may control the LISs 310 and 315 such that an angle of reflection at which the data service signal transmitted from the base station 230 is reflected by each of the LISs 310 and 315 receiving the second preamble signal corresponds to the second reference angle of incidence of the second preamble signal, based on identification information of the second preamble signal.

In an example embodiment, when a distance between each of the LISs 320 and 325 and the first terminal 753 is distant, the LIS controller 305 may control the angle of reflection of each of the LISs 320 and 325 to be the same. When the distance between each of the LISs 320 and 325 and the first terminal 753 is close, the LIS controller 305 may correct the angle of reflection of each of the LISs 320 and 325 and control the reflected data service signal to be directed toward the first terminal 753. The distance between each of the LISs 320 and 325 and the first terminal 753 may be determined based on reception power of the first preamble signal of the first reference LIS, for example, the LIS 325.

In an example embodiment, when a distance between each of the LISs 310 and 315 and the second terminal 755 is distant, the LIS controller 305 may control the angle of reflection of each of the LISs 310 and 315 to be the same. When the distance between each of the LISs 310 and 315 and the second terminal 755 is close, the LIS controller 305 may correct the angle of reflection of each of the LISs 310 and 315 and may control the reflected data service signal to be directed toward the second terminal 755. The distance between each of the LISs 310 and 315 and the second terminal 755 may be determined based on reception power of the second preamble signal of the second reference LIS, for example, the LIS 310.

When the determined distance is greater than or equal to a threshold, the LIS controller 305 may determine that the distance is distant. When the determined distance is less than the threshold, the LIS controller 305 may determine that the distance is close.

Hereinafter, a detailed operation of a communication method using an LIS is described with reference to FIG. 8.

Figure 8:
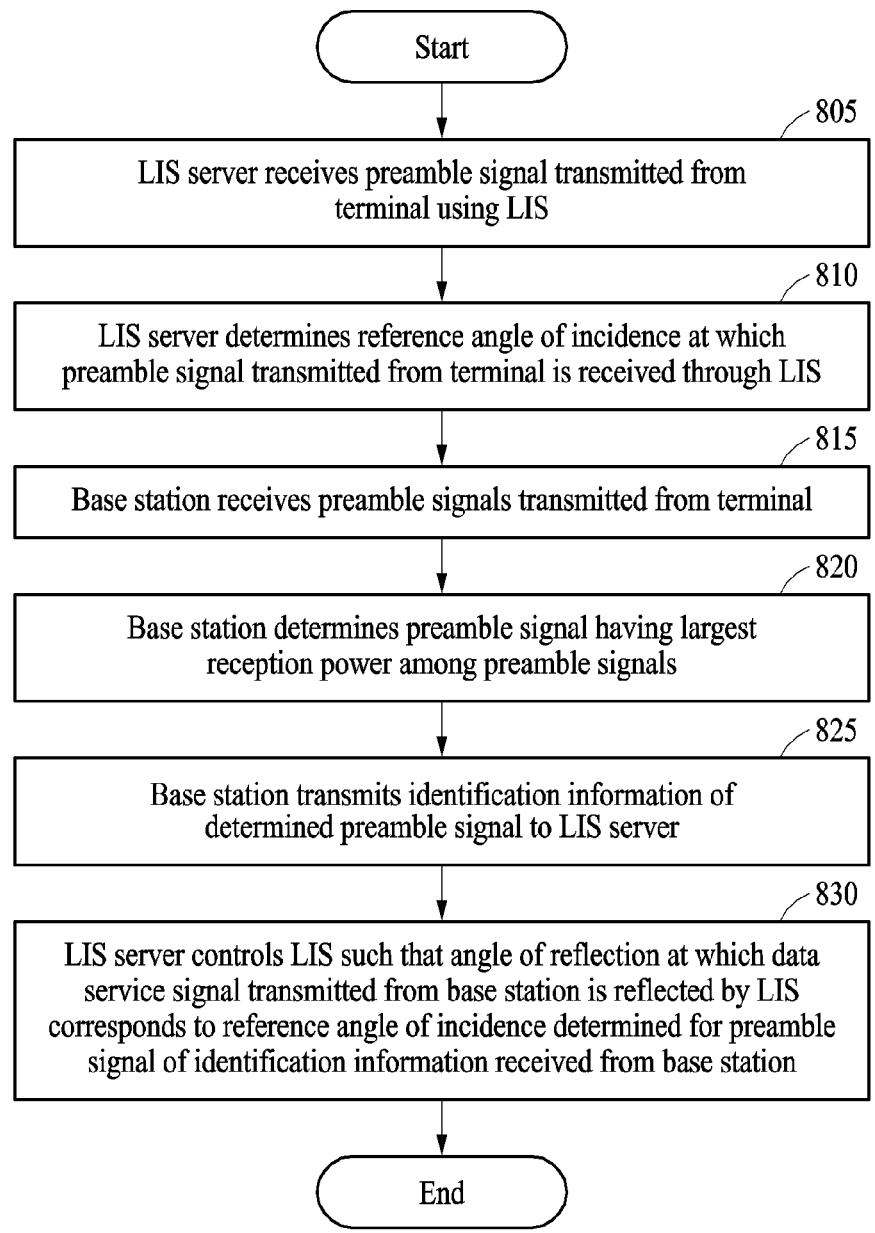
FIG. 8 is a flowchart illustrating a communication method using an LIS according to an embodiment of the disclosure.

FIG. 8 is a flowchart illustrating a communication method using an LIS according to an embodiment of the disclosure.

Referring to FIG. 8, in operation 805, an LIS server (e.g., the LIS server 220 of FIG. 2) may receive at least one preamble signal among preamble signals transmitted from a terminal (e.g., the terminal 225 of FIG. 2) using an LIS (e.g., the LIS 310 of FIG. 3). For example, the LIS server may receive a first preamble signal using a plurality of LISs (e.g., the plurality of LISs 310, 315, 320, and 325 of FIG. 3) each of which a radio wave reception direction is differently set.

The LIS server may tag and store preamble information of the first preamble signal received through the plurality of LISs and identification information of the first preamble signal for each LIS with information on an angle of incidence corresponding to a radio wave reception direction of each LIS, and delay time information and reception power information of the first preamble signal received through each LIS.

In operation 810, the LIS server may determine a reference angle of incidence at which the first preamble signal transmitted from the terminal is received through the LIS. For example, the LIS server may determine the LIS that receives the first preamble signal with the largest reception power among the plurality of LISs and may determine the angle of incidence corresponding to the radio wave reception direction of the determined LIS as a reference angle of incidence of the first preamble signal.

In an example embodiment, operations 805 and 810 may correspond to operation 405 of FIG. 4 corresponding to a location operation.

In operation 815, a base station (e.g., the base station 230 of FIG. 2) may receive preamble signals transmitted from the terminal, including the first preamble signal reflected by the LIS. When the base station receives the preamble signals, the base station may determine the terminal that requests a data service based on the received preamble signals.

In operation 820, the base station may determine a preamble signal having the largest reception power among the received preamble signals. That the reception power is largest may represent that a signal is delivered with the best efficiency among a plurality of radio wave delivery paths.

In operation 825, the base station may transmit identification information of the determined preamble signal to the LIS server. For example, the base station may transmit identification information of the first preamble signal having the largest reception power among the received preamble signals to the LIS server.

In operation 830, the LIS server may control the LIS such that an angle of reflection of a data service signal transmitted from the base station corresponds to a reference angle of incidence for the corresponding terminal, based on the identification information received from the base station.

In an example embodiment, when a preamble signal corresponding to the identification information received from the base station is present in at least one preamble signal received through the LIS, the LIS server may control the LIS such that the angle of reflection at which the data service signal transmitted from the base station is reflected by the LIS corresponds to an angle of incidence at which the preamble signal of the corresponding identification information is incident.

For example, the LIS server may control the plurality of LISs such that the angle of reflection at which the data service signal transmitted from the base station corresponds to the reference angle of incidence of the first preamble signal, based on the reference angle of incidence of the first preamble signal corresponding to the received preamble identification information.

In an example embodiment, operations 815, 820, 825, and 830 may be included in operation 410 of FIG. 4 corresponding to a positioning operation.

Hereinafter, a signal flow among a base station, an LIS device, and a terminal included in the wireless communication system 200 is described with reference to FIG. 9.

Figure 9:
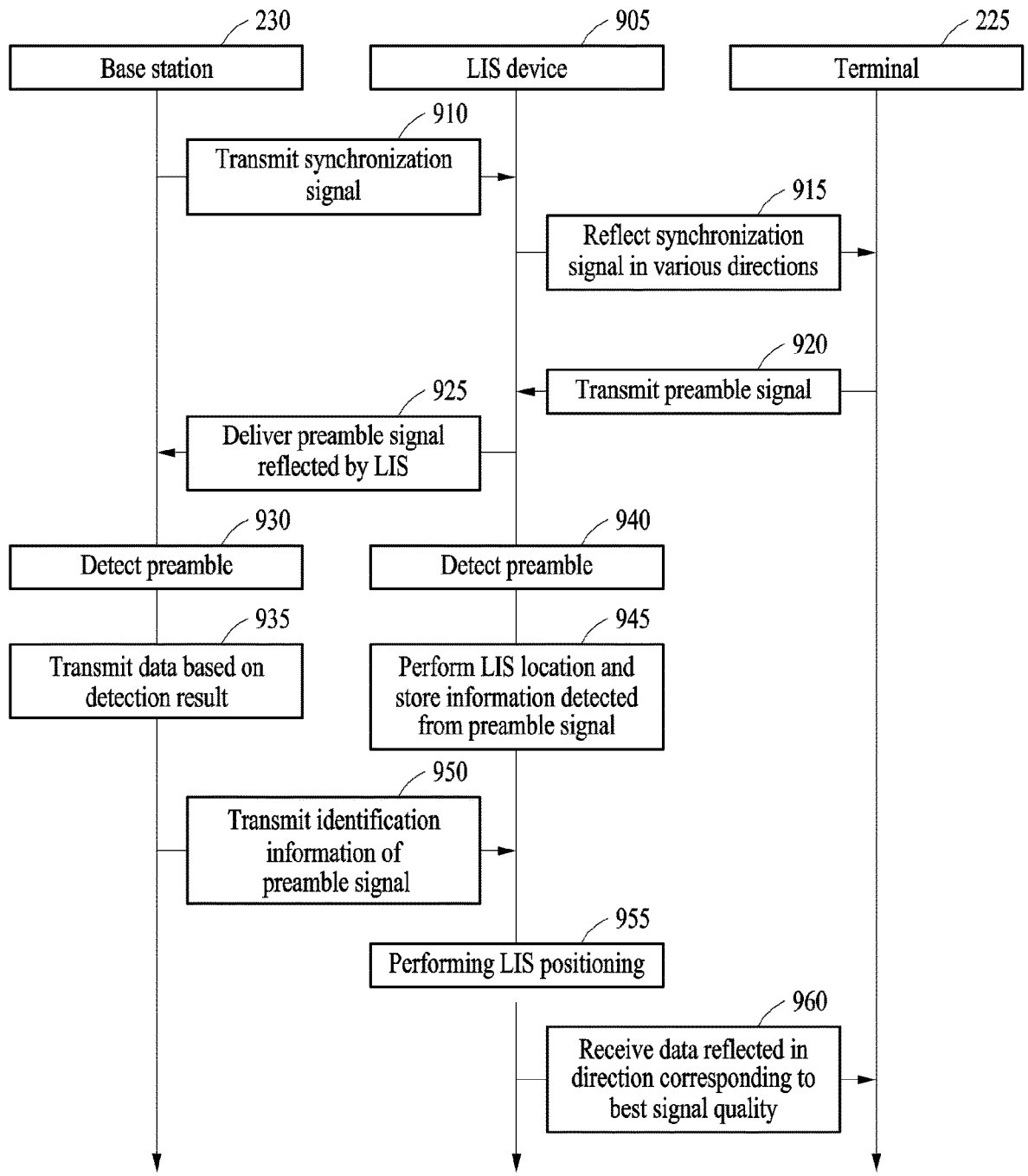
FIG. 9 is a flowchart illustrating a communication method using an LIS performed by a base station, an LIS device, and a terminal in a communication system according to an embodiment of the disclosure.

FIG. 9 is a flowchart illustrating a communication method using an LIS performed by a base station, an LIS device, and a terminal in a communication system according to an embodiment of the disclosure.

Referring to FIG. 9, a signal flow among the base station 230, an LIS device 905, and the terminal 225 is illustrated. The LIS device 905 may include a plurality of LISs (e.g., the plurality of LISs 310, 315, 320, and 325 of FIG. 3) and an LIS server (e.g., the LIS server 220 of FIG. 2).

In operation 910, the base station 230 may transmit a synchronization signal for downlink establishment. In operation 915, the synchronization signal may be reflected in various directions by the plurality of LISs and then delivered to the terminal 225.

The terminal 225 may receive the reflected synchronization signal in various directions through beam sweeping.

In operation 920, the terminal 225 may transmit preamble signals in various directions in which the synchronization signal is received. The preamble signals may be received and reflected through the LIS. In operation 925, the preamble signals transmitted from the terminal 225 may be delivered to the base station 230 through a multipath including a path through which the preamble signals are reflected by the LIS.

The LIS server may receive at least one preamble signal among the preamble signals transmitted from the terminal 225 through the plurality of LISs. For example, the LIS server may receive the first preamble signal transmitted from the terminal 225 through the plurality of LISs. The first preamble signal received through the plurality of LISs may be delivered to the LIS server.

In operation 940, the LIS server may detect preamble information and identification information from the first preamble signal.

In operation 945, the LIS server may tag and store the preamble information and the identification information included in the first preamble signal, information on an angle of incidence corresponding to a radio wave reception direction of the LIS that receives the first preamble signal, and delay time information and reception power information of the first preamble signal received through the corresponding LIS as information on the corresponding LIS.

The LIS server may compare the reception power of the first preamble signal received through each of the plurality of LISs, may determine the LIS corresponding to the largest reception power of the first preamble signal as a reference LIS for the first preamble signal, and may determine an angle of incidence corresponding to a radio wave reception direction of the corresponding LIS as a reference angle of incidence for the first preamble signal.

When the base station 230 receives the preamble signals delivered in operation 925, the base station 230 may detect preamble information and identification information of the preamble signals, in operation 930. In operation 935, the base station 230 may determine the terminal 225 that requests a data service based on the detected preamble information. The base station 230 may transmit a data service signal for the determined terminal 225

In operation 950, the base station 230 may determine a preamble signal having the largest reception power among the received preamble signals and may transmit identification information of the determined preamble signal to the LIS server. For example, the base station 230 may transmit identification information of the first preamble signal having the largest reception power among the received preamble signals to the LIS server.

When the LIS server receives the identification information of the preamble signal, the LIS server may perform a positioning operation for the terminal 225 that requests the data service, in operation 955. Description related to the positioning operation is made above with reference to FIG. 4 and FIG. 5B and thus, repeated description is omitted.

When the positioning operation is completed in operation 955, the data service signal transmitted from the base station 230 may be reflected by the LIS and concentrated in a direction in which the terminal 225 is present.

In operation 960, the terminal 225 may receive the data service signal with high reception power by receiving the data service signal in a direction in which the preamble signal is transmitted in operation 920.

A method for wireless communication using an LIS (e.g., the LIS 325) may include transmitting, by the terminal 225, preamble signals each with a different transmission time and transmission direction, receiving, by the LIS server 220, at least one preamble signal among the preamble signals through an LIS (e.g., the LIS 325) through which an incident radio wave is received and reflected and determining a reference angle of incidence for the at least one preamble signal, receiving, by the base station 230, the preamble signals that are delivered through a multipath from the terminal 225, transmitting, by the base station 230, identification information of a preamble signal having the largest reception power among the received preamble signals to the LIS server 220, and when the at least one preamble signal includes a preamble signal corresponding to the identification information received from the base station 230, controlling, by the LIS server 220, the LIS (e.g., the LIS 325) such that an angle of reflection at which a data service signal transmitted from the base station 230 is reflected by the LIS (e.g., the LIS 325) corresponds to the reference angle of incidence determined for the preamble signal of the identification information.

The determining of the reference angle of incidence may include receiving, by the LIS server 220, the at least one preamble signal transmitted from the terminal 225 using the plurality of LISs 310, 315, 320, and 325 each of which a different radio wave reception direction is differently set, and determining, by the LIS server 220, the reference angle of incidence for the at least one preamble signal based on the radio wave reception direction 535, 540, 545, 550 of each of the plurality of LISs 310, 315, 320, and 325 and the reception power of the at least one preamble signal.

The determining of the reference angle of incidence for the at least one preamble signal based on the radio wave reception direction and the reception power may include determining an LIS (e.g., the LIS 325) through which a first preamble signal included in the at least one preamble signal is received with the largest reception power among the plurality of LISs 310, 315, 320, and 325, and determining, by the LIS server 220, an angle of incidence corresponding to the radio wave reception direction (e.g., the radio wave reception direction 550) of the determined LIS (e.g., the LIS 325) as the reference angle of incidence of the first preamble signal.

The controlling of the LIS may include, when the at least one preamble signal includes a preamble signal corresponding to the identification information received from the base station 230, controlling, by the LIS server 220, the plurality of LISs 310, 315, 320, and 325 such that an angle of reflection at which the data service signal transmitted from the base station 230 is reflected by each of the plurality of LISs 310, 315, 320, and 325 corresponds to the reference angle of incidence determined for the preamble signal of the identification information.

The controlling of the plurality of LISs 310, 315, 320, and 325 may include determining a distance between the terminal 225 and each of the plurality of LISs 310, 315, 320, and 325, determining whether the distance is close, and when the distance is determined to be close, correcting the angle of reflection at which the data service signal transmitted from the base station 230 is reflected by each of the plurality of LISs 310, 315, 320, and 325.

The determining of the distance may include determining the distance based on the largest reception power among reception powers of the one or more preamble signals received through the plurality of LISs 310, 315, 320, and 325, and the determining whether the distance is close may include determining that the distance is distant when the determined distance is greater than or equal to a threshold.

The correcting may include correcting the angle of reflection of each of the plurality of LISs 310, 315, 320, and 325 based on a distance between the plurality of LISs 310, 315, 320, and 325 and the reference angle of incidence determined for the preamble signal of the identification information.

The LIS (e.g., the LIS 325) may be attached to an exterior wall of a building.

The method for wireless communication may further include transmitting, by the base station 230, a synchronization signal, receiving, by the terminal 225, the synchronization signal reflected by the plurality of LISs 310, 315, 320, and 325 in a plurality of directions, and transmitting, by the terminal 225, the preamble signals in the plurality of directions.

The method for wireless communication may further include transmitting, by the base station 230, the data service signal, and receiving, by the terminal 225, the data service signal reflected by the plurality of LISs 310, 315, 320, and 325.

The wireless communication system 200 using an LIS according to an example embodiment may include the terminal 225, the base station 230, an LIS (e.g., the LIS 325) including a meta-surface and in which an angle of reflection of an incident radio wave is adjusted according to an electrical stimulation, and the LIS server 220 configured to control the LIS (e.g., the LIS 325). The terminal 225 may transmit preamble signals each with a different transmission time and transmission direction, the LIS server 220 may receive at least one preamble signal among the preamble signals through the LIS (e.g., the LIS 325) and may determine a reference angle of incidence for the at least one preamble signal, the base station 230 may receive the preamble signals that are delivered through a multipath from the terminal 225, and may transmit identification information of a preamble signal having the largest reception power among the received preamble signals to the LIS server 220, and when the at least one preamble signal includes a preamble signal corresponding to the identification information received from the base station 230, the LIS server 220 may control the LIS (e.g., the LIS 325) such that an angle of reflection at which a data service signal transmitted from the base station 230 is reflected by the LIS (e.g., the LIS 325) corresponds to the reference angle of incidence determined for the preamble signal of the identification information.

The LIS server 220 may receive the at least one preamble signal transmitted from the terminal 225 using the plurality of LISs 310, 315, 320, and 325 each of which a radio wave reception direction is differently set, and may determine the reference angle of incidence for the at least one preamble signal based on the radio wave reception direction 535, 540, 545, 550 of each of the plurality of LISs 310, 315, 320, and 325 and the reception power of the at least one preamble signal.

The LIS server 220 may determine an LIS (e.g., the LIS 325) through which a first preamble signal included in the at least one preamble signal is received with the largest reception power among the plurality of LISs 310, 315, 320, and 325, and may determine an angle of incidence corresponding to the radio wave reception direction (e.g., the radio wave reception direction 550) of the determined LIS (e.g., the LIS 325) as the reference angle of incidence of the first preamble signal.

The LIS server 220 may tag and store reception power information of each of the plurality of LISs 310, 315, 320, and 325 through which the first preamble signal is received, delay time information of the first preamble signal, identification information of the first preamble signal, and information on an angle of incidence corresponding to the radio wave reception direction of each LIS.

When the at least one preamble signal includes a preamble signal corresponding to the identification information received from the base station 230, the LIS server 220 may control the plurality of LISs 310, 315, 320, and 325 such that an angle of reflection at which the data service signal transmitted from the base station 230 is reflected by each of the plurality of LISs 310, 315, 320, and 325 corresponds to the reference angle of incidence determined for the preamble signal of the identification information.

The LIS server 220 may determine a distance between the terminal 225 and each of the plurality of LISs 310, 315, 320, and 325, may determine whether the distance is close, and when the distance is determined to be close, correct the angle of reflection at which the data service signal transmitted from the base station 230 is reflected by each of the plurality of LISs 310, 315, 320, and 325.

The LIS server 220 may determine the distance based on the largest reception power among reception powers of the one or more preamble signals received through the plurality of LISs 310, 315, 320, and 325, and may determine that the distance is distant when the determined distance is greater than or equal to a threshold.

The LIS server 220 may correct the angle of reflection of each of the plurality of LISs 310, 315, 320, and 325 based on a distance between the plurality of LISs 310, 315, 320, and 325 and the reference angle of incidence determined for the preamble signal of the identification information.

The base station 230 may transmit a synchronization signal, and the terminal 225 may receive the synchronization signal reflected by the plurality of LISs 310, 315, 320, and 325 in a plurality of directions, and may transmit the preamble signals in the plurality of directions.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device using a large intelligent surface (LIS) comprising;
    one or more processors;
    memory storing one or more computer programs; and
    circuitry for communication using the LIS, and
    wherein the one or more computer programs include computer-executable instructions that, when executed by the one or more processors individually or collectively, cause the electronic device to:
        receive, via the LIS, at least one preamble signal transmitted from a terminal, wherein each of the at least one preamble signal having a different transmission time and transmission direction,
        determine a reference angle of incidence for each of the at least one preamble signal,
        receive, from a base station, identification information of a preamble signal having a largest reception power among the at least one received preamble signal, wherein the at least one preamble signal is transmitted by the terminal and received by the base station through a multipath, and
        based on the at least one preamble signal including one preamble signal corresponding to the identification information received from the base station, control the LIS such that an angle of reflection, at which a data service signal transmitted from the base station is reflected by the LIS, corresponds to the reference angle of incidence determined for the one preamble signal corresponding to the identification information.

2. The electronic device of claim 1, wherein the one or more computer programs include computer-executable instructions that, when executed by the one or more processors individually or collectively, further cause the electronic device to:
    receive the at least one preamble signal transmitted from the terminal using a plurality of LISs each of which a radio wave reception direction is differently set; and
    determine the reference angle of incidence for each of the at least one preamble signal based on the radio wave reception direction of each of the plurality of LISs and a reception power of each of the at least one preamble signal.

3. The electronic device of claim 2, wherein the one or more computer programs include computer-executable instructions that, when executed by the one or more processors individually or collectively, further cause the electronic device to:
    determine a first LIS through which a first preamble signal included in the at least one preamble signal is received with the largest reception power among the plurality of LISs; and
    determine an angle of incidence corresponding to the radio wave reception direction of the determined first LIS as the reference angle of incidence of the first preamble signal.

4. The electronic device of claim 3, wherein the one or more computer programs include computer-executable instructions that, when executed by the one or more processors individually or collectively, further cause the electronic device to:
    tag and store reception power information of each of the plurality of LISs through which the first preamble signal is received; and
    delay time information of the first preamble signal, identification information of the first preamble signal, and information on an angle of incidence corresponding to the radio wave reception direction of each LIS.

5. The electronic device of claim 2, wherein the one or more computer programs include computer-executable instructions that, when executed by the one or more processors individually or collectively, further cause the electronic device to, based on the at least one preamble signal including the one preamble signal corresponding to the identification information received from the base station, control the plurality of LISs such that the angle of reflection at which the data service signal transmitted from the base station is reflected by each of the plurality of LISs corresponds to the reference angle of incidence determined for the one preamble signal corresponding to the identification information.

6. The electronic device of claim 5, wherein the one or more computer programs include computer-executable instructions that, when executed by the one or more processors individually or collectively, further cause the electronic device to:
  determine a distance between the terminal and each of the plurality of LISs,
  determine whether the distance is a close distance that is less than a threshold; and
  based on determining that the distance is the close distance that is less than the threshold, correct the angle of reflection at which the data service signal transmitted from the base station is reflected by each of the plurality of LISs.

7. The electronic device of claim 6, wherein the one or more computer programs include computer-executable instructions that, when executed by the one or more processors individually or collectively, further cause the electronic device to:
  determine the distance based on the largest reception power among reception powers of one or more preamble signals received through the plurality of LISs; and
  determine that the distance is a distant distance based on determining that the distance is greater than or equal to the threshold.

8. The electronic device of claim 6, wherein the one or more computer programs include computer-executable instructions that, when executed by the one or more processors individually or collectively, further cause the electronic device to correct the angle of reflection of each of the plurality of LISs based on a distance between the plurality of LISs and the reference angle of incidence determined for the one preamble signal corresponding to the identification information.

9. The electronic device of claim 2,
  wherein the one or more computer programs include computer-executable instructions that, when executed by the one or more processors individually or collectively, further cause the electronic device to, receive, in a plurality of directions, the at least one preamble signal transmitted from the terminal that received a synchronization signal reflected by the plurality of LISs in the plurality of directions, and
  wherein the synchronization signal is transmitted from the base station.

10. The electronic device of claim 9, wherein the terminal is receiving the synchronization signal reflected by the plurality of LISs in a plurality of directions through beam sweeping.

11. The electronic device of claim 2, wherein the one or more computer programs include computer-executable instructions that, when executed by the one or more processors individually or collectively, further cause the electronic device to, based on a distance between the plurality of LISs and the terminal being a distant distance greater than or equal to a threshold, control an angle of reflection of each of the plurality of LISs to be the same.

12. The electronic device of claim 1,
  wherein the LIS comprises a plurality of LISs, and
  wherein the one or more computer programs include computer-executable instructions that, when executed by the one or more processors individually or collectively, further cause the electronic device to, based on a distance between each of the plurality of LISs and the terminal being a close distance less than a threshold, correct an angle of reflection of each of the plurality of LISs and control a reflected data service signal to be directed toward the terminal.

13. A method for wireless communication using a large intelligent surface (LIS), the method comprising:
  receiving, via the LIS, at least one preamble signal transmitted from a terminal, wherein each of the at least one preamble signal having a different transmission time and transmission direction;
  determining a reference angle of incidence for each of the at least one preamble signal;
  receiving, from a base station, identification information of a preamble signal having a largest reception power among the at least one received preamble signal, wherein the at least one preamble signal is transmitted by the terminal and received by the base station through a multipath; and
  based on the at least one preamble signal including one preamble signal corresponding to the identification information received from the base station, controlling the LIS such that an angle of reflection, at which a data service signal transmitted from the base station is reflected by the LIS, corresponds to the reference angle of incidence determined for the one preamble signal corresponding to the identification information.

14. The method of claim 13, wherein the receiving of the at least one preamble signal each having the different transmission time and transmission direction from the terminal through the LIS comprises:
  receiving the at least one preamble signal transmitted from the terminal using a plurality of LISs each of which a radio wave reception direction is differently set; and
  wherein determining a reference angle of incidence for each of the at least one preamble signal comprises:
  determining the reference angle of incidence for each of the at least one preamble signal based on the radio wave reception direction of each of the plurality of LISs and a reception power of each of the at least one preamble signal.

15. The method of claim 14, wherein the determining of the reference angle of incidence for each of the at least one preamble signal based on the radio wave reception direction and the reception power comprises:
  determining a first LIS through which a first preamble signal included in the at least one preamble signal is received with the largest reception power among the plurality of LISs; and
  determining an angle of incidence corresponding to the radio wave reception direction of the determined first LIS as the reference angle of incidence of the first preamble signal.

16. The method of claim 14, wherein the controlling of the LIS comprises, based on the at least one preamble signal including the one preamble signal corresponding to the identification information received from the base station, controlling the plurality of LISs such that the angle of reflection at which the data service signal transmitted from the base station is reflected by each of the plurality of LISs corresponds to the reference angle of incidence determined for the one preamble signal corresponding to the identification information.

17. The method of claim 16, wherein the controlling of the plurality of LISs further comprises;
- determining whether a distance is a close distance that is less than a threshold; and
- based on determining that the distance is the close distance that is less than the threshold, correcting the angle of reflection at which the data service signal transmitted from the base station is reflected by each of the plurality of LISs.

18. The method of claim 17, wherein the determining of the reference angle of incidence comprises:
- wherein the determining of the distance comprises determining the distance based on the largest reception power among reception powers of one or more preamble signals received through the plurality of LISs, and
- wherein the determining whether the distance is the close distance that is less than the threshold comprises determining that the distance is a distant distance based on the determined distance being greater than or equal to the threshold.

19. The method of claim 17, wherein the correcting comprises correcting the angle of reflection of each of the plurality of LISs based on a distance between the plurality of LISs and the reference angle of incidence determined for the one preamble signal corresponding to the identification information.

20. The method of claim 14, further comprising:
- receiving a synchronization signal from the base station;
- transmitting the synchronization signal reflected by the plurality of LISs in a plurality of directions to the terminal; and
- receiving preamble signals in the plurality of directions from the terminal.

* * * * *